US012638035B2

(12) United States Patent
Soytürk et al.

(10) Patent No.: US 12,638,035 B2
(45) Date of Patent: May 26, 2026

(54) SHELF SYSTEM

(71) Applicant: Zarges GmbH, Weilheim (DE)

(72) Inventors: Erkan Soytürk, Weilheim (DE);
Torsten Mähler, Dresden (DE)

(73) Assignee: Zarges GmbH, Weilheim (DE)

( * ) Notice: Subject to any disclaimer, the term of this
patent is extended or adjusted under 35
U.S.C. 154(b) by 177 days.

(21) Appl. No.: 18/117,256

(22) Filed: Mar. 3, 2023

(65) Prior Publication Data

US 2023/0279885 A1 Sep. 7, 2023

(30) Foreign Application Priority Data

Mar. 3, 2022 (DE) ..................... 20 2022 101 188.5

(51) Int. Cl.
*F16B 7/04* (2006.01)
*A47B 47/02* (2006.01)
(Continued)

(52) U.S. Cl.
CPC .......... *F16B 7/0406* (2013.01); *A47B 47/028*
(2013.01); *A47B 96/06* (2013.01);
(Continued)

(58) Field of Classification Search
CPC ....... A47B 96/06; A47B 96/067; A47B 96/14;
A47B 96/1433; A47B 96/1441;
(Continued)

(56) References Cited

U.S. PATENT DOCUMENTS 3,523,508 A * 8/1970 Maslow ............... A47B 57/265
D6/675.2
4,250,679 A * 2/1981 Burg ....................... F16B 12/28
52/654.1
(Continued)

FOREIGN PATENT DOCUMENTS

DE 1860746 U 10/1962
DE 1996191 U1 5/1968
(Continued)

OTHER PUBLICATIONS

Search Report issued in German Patent Application No. DE 20 2022
101 188.5, dated Nov. 14, 2022 (from which this application claims
priority) and English language translation thereof.
(Continued)

*Primary Examiner* — Devin K Barnett
(74) *Attorney, Agent, or Firm* — Ewers IP Law PLLC;
Falk Ewers

(57) ABSTRACT
A shelf system with bars and with at least one connecting
strut for connecting two bars adjacent to each other is
provided. The connecting strut has receiving devices on its
end faces. An undercut profile extending substantially par-
allel to the bar is attached or can be attached to the bar of the
shelf system. Every undercut profile has two or more profile
parts which are detachable from one another and can be
joined together to form mutually flush surfaces. The profile
part has a projection, which can be inserted into a recess of
a bar, respectively, and the receiving device of the connect-
(Continued)

ing strut can be pushed onto the undercut profile in its joined state.

16 Claims, 8 Drawing Sheets

(51) Int. Cl.

| | |
|---|---|
| *A47B 96/06* | (2006.01) |
| *A47B 96/14* | (2006.01) |
| *A47B 47/00* | (2006.01) |
| *A47B 57/20* | (2006.01) |
| *A47B 57/30* | (2006.01) |
| *A47B 57/48* | (2006.01) |

(52) U.S. Cl.
CPC ...... *A47B 96/1441* (2013.01); *A47B 47/0083* (2013.01); *A47B 57/20* (2013.01); *A47B 57/30* (2013.01); *A47B 57/48* (2013.01)

(58) Field of Classification Search
CPC . A47B 2096/1491; A47B 57/00; A47B 57/06; A47B 57/10; A47B 57/16; A47B 57/20; A47B 57/26; A47B 57/265; A47B 57/30; A47B 57/32; A47B 57/34; A47B 57/48; A47B 57/482; A47B 57/54; A47B 57/545; A47B 47/00; A47B 47/0083; A47B 47/021; A47B 47/027; A47B 47/028; F16B 7/0401
See application file for complete search history.

(56) References Cited

U.S. PATENT DOCUMENTS

| | | | | |
|---|---|---|---|---|
| 4,318,352 | A * | 3/1982 | Friedman | A47B 57/265 |
| | | | | 248/188 |
| 4,934,858 | A * | 6/1990 | Beaulieu | F16B 12/40 |
| | | | | 403/174 |
| 5,833,337 | A * | 11/1998 | Kofstad | H05K 7/1489 |
| | | | | 211/175 |
| 6,615,992 | B1 * | 9/2003 | Lauchner | H05K 7/1489 |
| | | | | 211/175 |
| 6,929,336 | B2 * | 8/2005 | Liu | H05K 7/1421 |
| | | | | 312/334.4 |
| 7,284,672 | B2 * | 10/2007 | Tsai | H05K 7/1489 |
| | | | | 403/231 |
| 7,543,540 | B2 * | 6/2009 | Tatematsu | F16B 12/46 |
| | | | | 108/192 |
| 7,780,253 | B1 * | 8/2010 | Lu | H05K 7/183 |
| | | | | 312/334.4 |
| 7,950,753 | B2 * | 5/2011 | Liang | A47B 88/43 |
| | | | | 312/334.4 |
| 8,016,140 | B2 * | 9/2011 | Hsieh | A47B 47/0083 |
| | | | | 211/187 |
| 8,118,181 | B2 * | 2/2012 | Shinozaki | A47B 47/0083 |
| | | | | 211/208 |
| 8,678,207 | B2 * | 3/2014 | Shimazaki | A47B 57/545 |
| | | | | 211/208 |
| 9,247,809 | B1 * | 2/2016 | Hsu | F16B 12/40 |
| 9,930,805 | B2 * | 3/2018 | Chen | A47B 96/068 |
| 10,051,758 | B2 * | 8/2018 | Hofmann | H05K 7/1489 |
| 10,058,174 | B1 * | 8/2018 | Tang | A47B 57/545 |
| 10,136,548 | B2 * | 11/2018 | Chen | F16C 29/02 |

| | | | | |
|---|---|---|---|---|
| 10,206,506 | B1 * | 2/2019 | Lai | A47B 96/1433 |
| 10,213,017 | B2 * | 2/2019 | Chen | F16C 29/04 |
| 10,299,588 | B1 * | 5/2019 | Lai | A47B 95/00 |
| 10,356,931 | B1 * | 7/2019 | Chen | A47B 96/061 |
| 10,455,935 | B1 * | 10/2019 | Chen | A47B 47/027 |
| 10,660,435 | B2 * | 5/2020 | Miller, Jr. | F25D 25/02 |
| 11,419,412 | B1 * | 8/2022 | Chen | A47B 57/36 |
| 11,627,801 | B2 * | 4/2023 | Chen | A47B 57/48 |
| | | | | 211/187 |
| 11,627,802 | B1 * | 4/2023 | Liu | A47B 57/40 |
| | | | | 211/187 |
| 11,700,940 | B1 * | 7/2023 | Chen | F16B 2/245 |
| | | | | 211/187 |
| 2002/0195408 | A1 * | 12/2002 | Hegrenes | H05K 7/183 |
| | | | | 312/265.4 |
| 2004/0065633 | A1 * | 4/2004 | Chen | A47F 5/13 |
| | | | | 211/175 |
| 2004/0079712 | A1 * | 4/2004 | Mayer | H05K 7/1491 |
| | | | | 211/26 |
| 2004/0089779 | A1 * | 5/2004 | Greenwald | H05K 7/1421 |
| | | | | 248/298.1 |
| 2005/0189855 | A1 * | 9/2005 | Naue | A47B 88/43 |
| | | | | 312/334.4 |
| 2005/0285492 | A1 * | 12/2005 | Hu | A47B 88/43 |
| | | | | 312/334.4 |
| 2005/0285493 | A1 * | 12/2005 | Hu | A47B 88/43 |
| | | | | 312/334.4 |
| 2008/0067907 | A1 * | 3/2008 | Chen | A47B 88/43 |
| | | | | 312/312 |
| 2008/0078899 | A1 * | 4/2008 | Chen | A47B 88/43 |
| | | | | 248/220.21 |
| 2009/0219701 | A1 * | 9/2009 | Wu | H05K 7/1494 |
| | | | | 361/727 |
| 2010/0155352 | A1 * | 6/2010 | Hsieh | A47B 57/265 |
| | | | | 211/183 |
| 2010/0200523 | A1 * | 8/2010 | Henderson | H05K 7/18 |
| | | | | 211/26 |
| 2010/0243586 | A1 * | 9/2010 | Henderson | H05K 7/1489 |
| | | | | 248/220.21 |
| 2012/0074281 | A1 * | 3/2012 | Chen | H05K 7/1421 |
| | | | | 248/224.8 |
| 2013/0098857 | A1 * | 4/2013 | Jarvis | A47B 57/545 |
| | | | | 211/182 |
| 2014/0104777 | A1 * | 4/2014 | Henderson | A47B 96/06 |
| | | | | 403/345 |
| 2018/0084908 | A1 * | 3/2018 | Chen | A47B 57/487 |
| 2018/0168341 | A1 * | 6/2018 | Chen | A47B 88/427 |
| 2018/0289151 | A1 * | 10/2018 | Dahatonde | A47B 96/1441 |
| 2018/0317651 | A1 * | 11/2018 | Tang | A47B 57/545 |
| 2019/0059585 | A1 * | 2/2019 | Chen | A47B 88/43 |
| 2019/0343277 | A1 * | 11/2019 | Sabounjian | A47B 47/0083 |

FOREIGN PATENT DOCUMENTS

| | | | |
|---|---|---|---|
| DE | 8215450 | U1 | 11/1982 |
| DE | 8407184 | U1 | 8/1984 |
| JP | H1156489 | A | 3/1999 |
| JP | H11318586 | A | 11/1999 |

OTHER PUBLICATIONS

European Search Report dated Jun. 20, 2023, in European counterpart application No. EP 23159046.4.

* cited by examiner

SHELF SYSTEM

CROSS REFERENCE TO RELATED APPLICATIONS

This application claims priority to German utility model application DE 20 2022 101 188.5, filed Mar. 3, 2022, the entire content of which is incorporated herein by reference.

TECHNICAL FIELD

The disclosure relates to a shelf system.

BACKGROUND

Such shelf systems have been known for a long time. They consist of bars for vertical support of shelf boards or other load-bearing devices such as drawers or telescopic pull-outs. It is often desired that the type of load-bearing device is variable and can be adapted to the application. For example, telescopic pull-outs require a different anchoring to the bars than shelf boards. In the case of telescopic pull-outs, the anchoring on the rear bars must also be able to absorb forces in the upward direction.

If such a modular system is desired, it makes sense to connect adjacent bars with connecting struts. A loadable connection between bar and connecting strut is then desired. In many cases, it is also desirable for the connection to be detachable. A detachable connection has the advantage that shelves can also be modified to meet changing requirements. For this purpose, different connecting struts can then be used, for example, or a number of connecting struts can be replaced by other load-bearing devices.

Preferably, the connection can be made and released without tools. Such a type of connection between the connecting strut and the bar is particularly advantageous if a shelf is to be assembled or converted by a single person.

For this reason, plug-in connections are frequently used, in which the connecting strut is plugged or clipped onto a connecting element on the bar and, if necessary, snapped into place there.

To enable height adjustment, it has long been known to provide the bars with hole lines. The holes have the same distance to each other. The specified grid dimension then allows any load-bearing devices to be used. Such shelf systems with hole lines arranged in a grid pattern have also been known for a long time. One example is the solution known from DE 19 96 191 U1. However, the shelf systems known so far are either not very durable or not flexible enough, or they cannot be easily converted.

SUMMARY

Therefore, the disclosure is based on the object of creating a shelf system which combines good durability with high flexibility and the possibility of easy conversion.

This object is achieved by a shelf system as described herein.

According to a first aspect this object is solved by a shelf system, with bars and with at least one connecting strut for the connection of 2 bars adjacent to one another, the connecting strut having receiving devices on its end faces, characterized in that an undercut profile extending essentially parallel to the bar is attached or can be attached to the bar of the shelf system, and in that each undercut profile has two or more profile parts which can be detached from one another and can be joined together, in each case forming mutually flush surfaces, and in that the profile part has a projection which can be inserted into a recess of a bar, respectively, and in that the receiving device of the connecting strut can be pushed onto the undercut profile in its joined state.

In a technically beneficial embodiment of the shelf system the receiving devices are C-shaped in section parallel to the connecting strut and form a C profile, and in that the undercut profiles form a T-profile in section parallel to the connecting strut, and in that the C-profile fits onto the T-profile with a clearance-free fit, optionally with a fit under pretension.

In a further technically beneficial embodiment of the shelf system the receiving devices have a stop at one end—viewed parallel to the bar—with which in particular a further movement of the undercut profile in the receiving device is blocked.

In a further technically beneficial embodiment of the shelf system each undercut profile has two or more profile parts which can be detached from one another and can be joined together to form mutually flush end faces and/or mutually flush side faces and/or mutually flush transverse faces, and the profile part has a projection which can be inserted into a recess of a bar, respectively.

In a further technically beneficial embodiment of the shelf system the joining of the profile parts fixes them with their projections in recesses of the bar, in particular adjacent recesses.

In a further technically beneficial embodiment of the shelf system the profile parts can be pivoted with respect to one another for joining and for detaching, in particular each profile part about the projection and about an axis which extends transversely with respect to the bar.

In a further technically beneficial embodiment of the shelf system each profile part has a convex surface and a concave surface spaced apart from the convex surface, and that the convex surface of one profile part has a radius of curvature corresponding to the radius of curvature of the concave surface of the other profile part.

In a further technically beneficial embodiment of the shelf system the profile parts have clamping elements with which they engage with one another, and in that the profile parts can be separated from one another by overcoming the engagement force.

In a further technically beneficial embodiment of the shelf system the profile parts are identical in shape to each other.

In a further technically beneficial embodiment of the shelf system in the pushed-on state of the receiving device onto the undercut profile, detachment and/or pivoting of the profile parts is blocked.

In a further technically beneficial embodiment of the shelf system the projection consists of an in particular round and flat-cylindrical cone-shaped central region and a locking tongue-like end region extending out of the latter and intended for engaging behind the wall of the bar.

In a further technically beneficial embodiment of the shelf system the locking tongue has dimensions which are smaller than the diameter of a bar recess and in that the locking tongue is bent at the end, in particular ends in a semicircular shape.

In a further technically beneficial embodiment of the shelf system the projection can be inserted into the bar recess when the profile part is inclined with respect to the bar and can be withdrawn therefrom, and that insertion and withdrawal are blocked when the profile part is aligned parallel to the bar.

In a further technically beneficial embodiment of the shelf system the receiving device has at least one snap-in tongue which engages in a snap-in notch of the undercut profile and allows the receiving device to be detached from the undercut profile only by overcoming an engagement force.

According to a second aspect this object is solved by a shelf system, having at least two shelf segments with bars and having at least one connecting strut for connecting two mutually adjacent shelf segments, the connecting strut having a first receiving device on a first end face and a second receiving device on a second end face, characterized in that an undercut profile extending essentially parallel to the bar is attached or can be attached to the bar of the first shelf segment, in that an undercut profile extending essentially parallel to the bar is attached or can be attached to the bar of the second shelf segment, and in that the connecting strut can be pushed onto the two undercut profiles with both receiving devices simultaneously when the first and second shelf segments are standing next to one another at a predetermined distance and in the pushed-on state thereof fixes the shelf segments to one another.

According to the disclosure, the connection between the connecting strut and the bar is provided by an undercut profile which has a special structure.

The profile consists of two profile parts or, if applicable, more than two profile parts that can be detached from each other and extend flush with each other in the joined state. This means that at least the surfaces of the profile parts of the profile that are important for the joining task extend flush with each other. Every profile part has at least one projection that is insertable into a recess or hole in the bar.

When inserting the projection into the hole, the profile part is separate from the other profile part. Both profile parts are first inserted with their projections into the respective matching holes of the bar. For insertion, the two profile parts extend at an angle to each other or at least at an angle to the bar. When the projections are fully inserted, the two profile parts are pivoted towards each other. They then extend parallel to the bar and preferably engage with each other. In this state, the aforementioned surfaces of the profile parts are flush with each other.

Due to the flushness, the two-part undercut profile acts as a one-piece profile. A receiving device of the strut can be pushed onto the undercut. The receiving device then surrounds both profile parts, thus ensuring that they remain in the flush position relative to each other.

Preferably, pushing on requires a certain force, preferably a downward force. In the connected state, the receiving device and the undercut profile are press-fitted to each other and, if necessary, additionally engaged. The connecting strut preferably extends perpendicularly to the bar in a manner known per se, i.e. horizontally when the bar is on a horizontal floor.

The term "undercut" is used here to mean any shape which ensures that the connecting strut engages behind a profile part, i.e. cannot simply be pulled away from it in its direction of extension. "Profile" means here that the shape, viewed in one direction (=the profile direction), has a constant cross-section or at least a cross-section that is constant in terms of function. Such a profile is also given if profile parts—viewed in the profile direction—have a recess in an area that does not impair the function, or, for example, a slit, as almost always occurs when parts bear against each other due to production and tolerances.

Preferably, the connecting strut has receiving devices at both ends. The receiving devices each fit undercut profiles attached to adjacent bars on the sides facing each other. The connecting strut is now placed on the two undercut profiles in such a way that they can enter the receiving devices.

Due to a uniform downward force applied to the connecting strut, the receiving devices slide onto the undercut profiles in such a way that they are completely received in the receiving devices. Preferably, the projections are arranged in such a way that they can extend into adjacent holes but diverge from one another. To this end, they each extend from the ends of the two profile parts facing away from one another in the direction of the bar. They each form a shoulder at this point.

In the assembled state, the largest area of each profile part extends outside the bar. It lies against the outside of the bar. A center region of every profile part extends in the hole of the bar and the end region of every profile part extends inside the bar. The shoulder at the end region engages behind the bar and lies against it on the inside.

Every profile part can be removed from the hole only when it is swung off from the bar. When both profile parts extend towards each other, they are engaged or jammed. A release force is then required to release this connection. Releasing takes place by pivoting the profile parts away from each other in a clockwise direction.

Pivoting away takes place about the center region of the profile part which extends through the hole of the bar. If the profile parts are sufficiently separated from each other, i.e. can move freely from each other, they can be swung off. In this context, "swinging off" is to be understood as a swiveling movement perpendicular to the pivoting away.

To detach the undercut profile from the bar, it is first necessary to remove any connecting strut mounted there. This is the prerequisite for the profile parts to be pivoted away from each other.

In the next step, the clamp connection or snap-in connection of both profile parts to each other is released. When both profile parts are separated from each other, they are swung off the bar one after the other or simultaneously and can then be removed from the hole in the bar.

Assembly is carried out in the reverse order. Both profile parts are inserted with their projections into adjacent holes in the bar and placed against the bars. In this position, they still extend spaced apart from each other. They are then pivoted towards each other until they engage or clamp together. In this position, pull-out safety is ensured.

At any later stage, a connecting strut can then be fitted as described above and securely anchored to the bar via the profile. As can be seen from the above, it must be ensured that every profile part can be pivoted around the projection in the recess, i.e. the hole, of the bar. Preferably, the hole is circular, and the central region of the profile part is also circular. Any other shapes that ensure the pivotability are possible.

The undercut profile fits into the receiving device of the connecting strut with a clearance-free fit. Preferably, the relative dimensions of the abutting surfaces of these two are selected so that pushing on is possible with a certain force, the pushing-on force. Releasing is also possible with the application of a certain force, the release force.

The undercut profile and the receiving device are in frictional connection with each other. Typically, the static friction is somewhat greater than the sliding friction, so that the release force exceeds the pushing-on force. The relative dimensions also determine the magnitude of these two forces, which can be adapted to the requirements to a large extent, e.g. between 10 KN and 500 KN. The frictional connection can be realized in any suitable way.

According to the disclosure, the connection is designed as a sliding connection. Due to the sliding connection, both elements can only be moved in exactly one direction relative to each other. This direction is preferably the vertical direction, i.e. the direction in which the bar extends.

The connecting strut can be pushed onto the undercut profile by a downward movement and released again by an upward movement. Viewed in cross-section, the two elements fit together. For example, the receiving device may have a C-shaped cross-section and the undercut profile may have a T-shaped cross-section, said cross-sections matching one another.

Typically, the holes or recesses of the bars are arranged in a predetermined grid dimension. The two projections of an undercut profile are arranged at such a distance from each other that they can engage in adjacent holes. However, it is also possible to select the distance to any multiple.

In any case, due to the grid arrangement, the strut can be attached to the bar at any height position. It is also possible to attach any number of struts distributed over the height of the bar. Preferably, a rear bar and a front bar are connected to each other via fixed struts. The fixed struts are preferably bolted at their ends to one front strut and one rear strut. Preferably 2 fixed struts are provided per pair of bars. The arrangement of a front bar and a rear bar and the at least two fixed struts connecting them forms a shelf frame.

According to the disclosure, adjacent shelf frames can be detachably connected to one another with the connecting struts. This applies both to adjacent rear bars and to adjacent front bars.

The inventive design of the connection between the bar and the connecting strut has a particular advantage:

A shelf system according to the disclosure can be easily assembled by a single assembler. The assembler takes two shelf frames and a connecting strut. After mounting the form-fitting profile, the assembler engages the connecting strut onto a shelf frame, preferably onto the front bar.

The assembler holds the fixed combination of a shelf frame and connecting strut with one hand on the connecting strut. With the other hand, the assembler takes the other shelf frame and also engages the connecting strut with its free end on the other shelf frame after mounting the form-fitting profile.

This provides a basic element or segment of the shelf which is able to stand and to which other elements of the shelf can be attached as desired. This assembly simplification is made possible by the fact that the assembly of the connecting strut to the bar is a simple sliding movement from top to bottom. Moreover, this can be done at both ends of the connecting strut at the same time, even with one hand.

To do this, the assembler grips the connecting strut in the middle and pulls down so that an equal force on both ends engages the connecting strut at each end. Due to the inherent pretension of the connection, the connection is also so strong that there is sufficient stability against a tilting movement or the like.

It is preferred that the receiving device engages the undercut profile in the pushed-on state. For this purpose, two snap-in tongues are formed at the upper end of the receiving device, which face each other and are pretensioned and engage the undercut profile as soon as it has reached the end position.

Preferably, the profile parts have clamping elements that allow both profile parts to clamp or engage one another to form the undercut profile. In this state, different surfaces of the profile parts extend flush with each other so that the profile parts form an overall profile.

Preferably, the profile parts are injection molded and made of plastic. Surfaces of the profile parts facing each other have radii, i.e. they are either convex or concave at the point where there is a convex surface on one profile part and where there is a concave surface on the other profile part.

The convex and concave surfaces are offset from each other, preferably both in height, i.e. distance from the bar, and in distance from the projection. This ensures that both profile parts are identical in shape, i.e. can be produced with the same injection mold.

The clamping elements may consist of areas where adjacent surfaces of the profile parts bear against each other in an interference fit. At these areas, there may also be small undulations or serrations in the material which improve clamping or engaging, but which can be overcome by exerting the clamping force.

Further details, advantages and features will be apparent from the following description of an exemplary embodiment of the disclosure with reference to the drawing, in which:

BRIEF DESCRIPTION OF THE DRAWINGS

The disclosure will now be described with reference to the drawings wherein.

DESCRIPTION OF EXEMPLARY EMBODIMENTS

Figure 1:
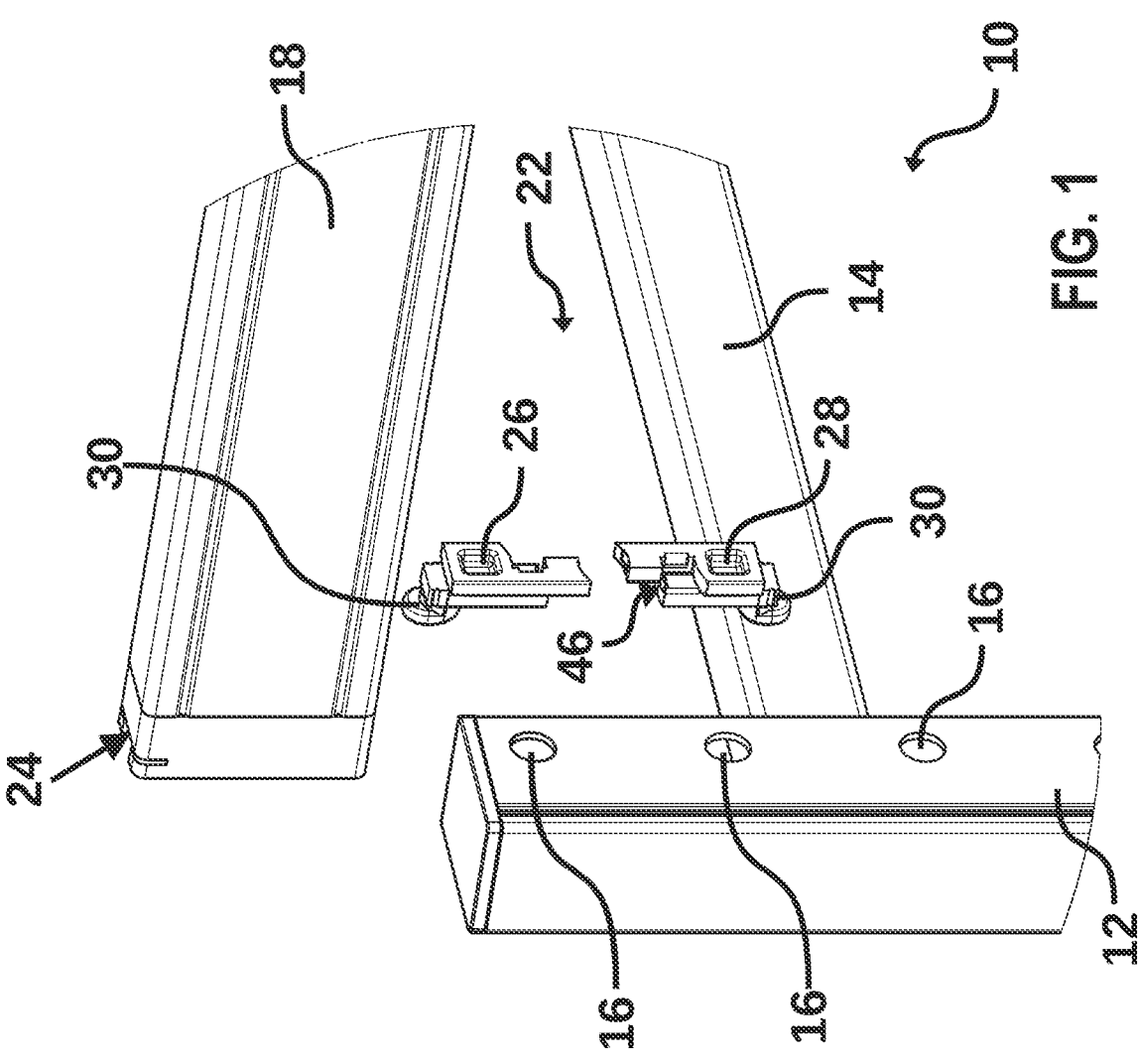
FIG. 1 shows a schematic perspective drawing of a part of a shelf system according to an exemplary embodiment of the disclosure, showing a part of the bar, the fixed strut, the connecting strut and the profile parts of the undercut profile, in one exemplary embodiment of the disclosure.

A small section of a shelf system 10 is shown in FIG. 1. The shelf system 10 has 4 bars, of which a front bar 12 can be seen in FIG. 1. The bar 12 is connected to a rear bar, which is not shown, by a fixed strut 14. The connection can be made in any suitable manner and, for example, via a screw connection. The bar 12 has a plurality of recesses 16 arranged one above the other, in a grid pattern, i.e., equidistant from each other. A connecting strut 18 is to be detachably fastened to the bar 12. A connection according to the disclosure is used for this purpose. It consists of a receiving device 20 and an undercut profile 22.

FIG. 1 shows the state before the connection is established. The receiving device 20 is firmly connected to connecting strut 18, for example by a screw connection. The receiving device 20 is preferably made of plastic and is an injection-molded part.

It has a vertically extending slit 24 that is part of a C-shaped cross-section. This can also be seen in FIG. 5. Vertical here means parallel to the bar 12 and perpendicular to the connecting strut 18. Matching the C-shaped cross-section of the receiving device 20, the undercut profile 22 has a T-shaped cross-section. This can also be seen in FIG. 1, but even better in FIG. 3.

The undercut profile 22 consists of a profile part 26 and a profile part 28. Both profile parts have the same shape. They have projections 30. The projection 30 of the profile part 26 extends obliquely upwards, in the illustration according to FIG. 1 towards the bar 12, and the projection 30 of the profile part 28 extends obliquely downwards, towards the bar 12.

Figure 2:
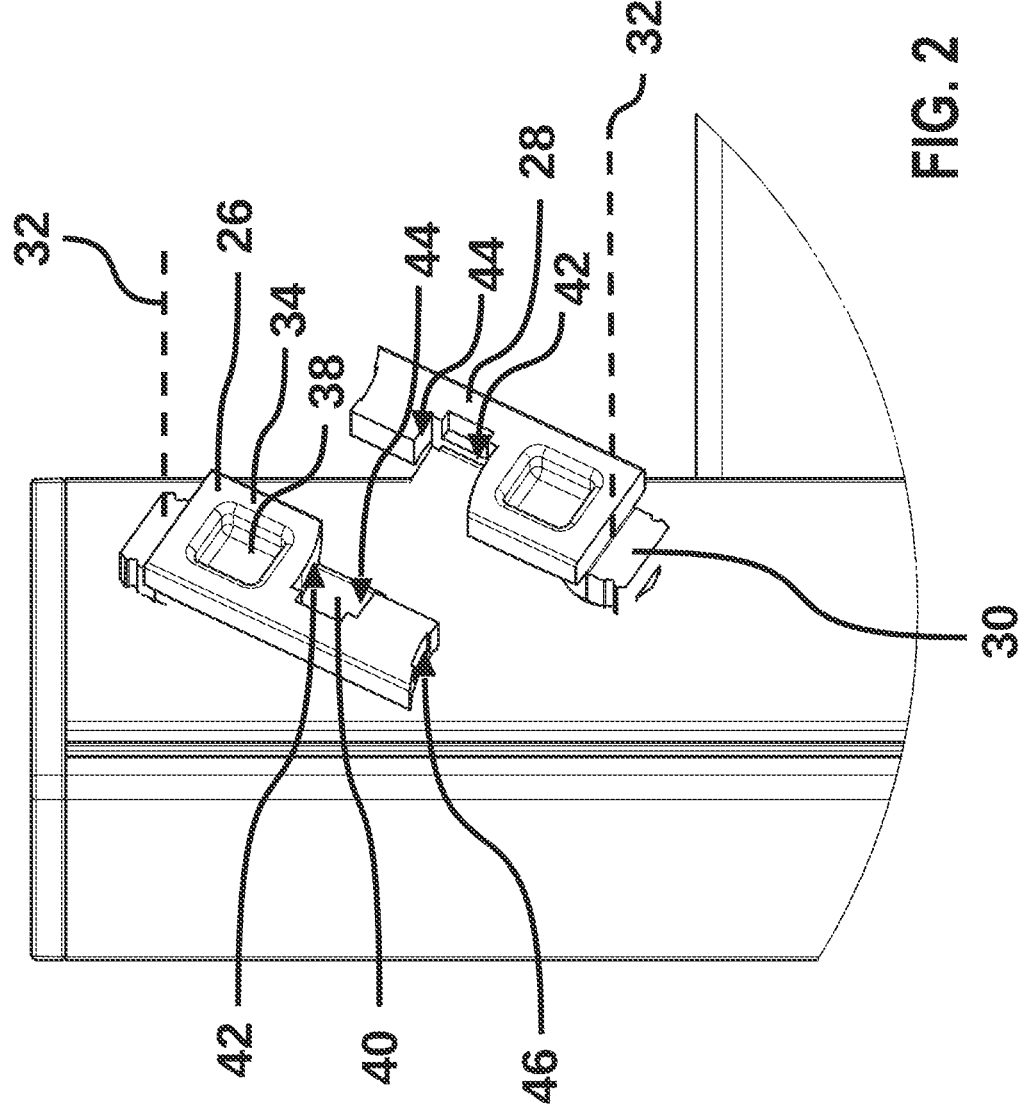
FIG. 2 shows an enlarged illustration of the profile parts inserted in recesses of the bar compared with FIG. 1.

The dimensions of the projections 30 are chosen so that both can be inserted into recesses 16 when the associated profile part is tilted slightly. In this respect, the projection 30 is first inserted into the relevant recess 16, and then the rest of the profile part is brought into contact with the bar. The latter is not possible in the position of the profile parts 26 and 28 shown in FIG. 1. Instead, the profile parts must be pivoted against each other, as shown in FIG. 2.

In comparison with FIG. 1, the profile parts 26 and 28 are each pivoted in a clockwise direction. The pivot angle in the illustrated exemplary embodiment is about 20 degrees, but can be selected as desired.

Each profile part 26 and 28 can be pivoted about an axis 32. The axis is also the axis of the relevant recess 16 into which the projection 30 is inserted. The profile parts 26 and 28 have a T-shape in cross-section. In any case, a transverse leg 34 of the T is wider than the projection 30 and a center leg 36 of the Ts, which can be seen in FIG. 1.

The profile part 26 is described below. Subsequent to the projection 30, the transverse leg 34 extends in its full width. A recess 38 is visible there, which is implemented in this way to save material but has no particular technical function. Following this area, a lateral recess 40 is provided. It is formed on a convex surface 42, the radius of which corresponds to the distance to the axis 32 of the profile part 26. The recess 40 ends at a straight surface 44, at which the profile part 26 does not project with its transverse leg 34 to the maximum width of the transverse leg 34, but only to about half of its width.

At this point, the center leg 36 also terminates at an end surface 45 that is more readily apparent from FIG. 1. From this point, the transverse leg 34 extends to an end surface 46, which is concavely curved. The radius again corresponds to the distance to the axis 32, but to the axis of the opposite profile part 28. This particular design of the profile parts 26 and 28 allows both to pivot towards each other and then to form a secure anchorage and bearing to the recesses 16 of the bar 12 for the connecting strut 18.

Figure 3:
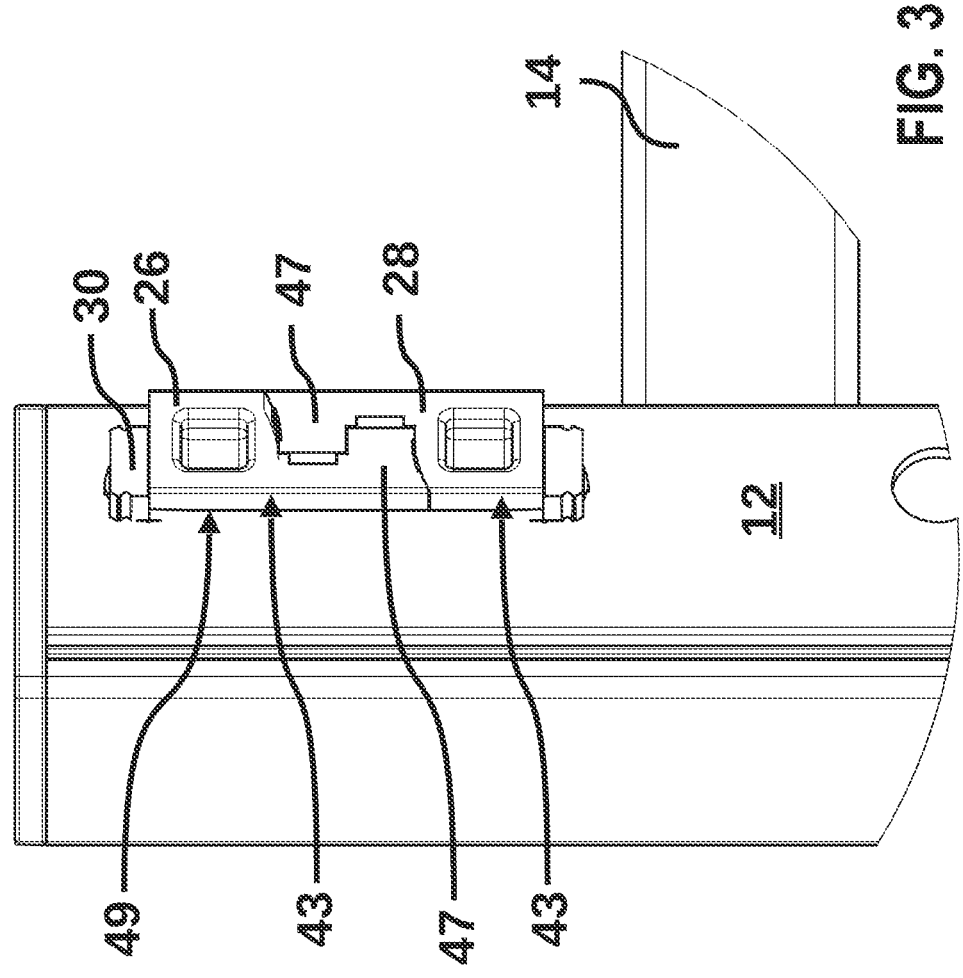
FIG. 3 shows a perspective illustration of the profile parts in the state in which they are pivoted towards each other and form the undercut profile.

The pivoted state of the profile parts 26 and 28 towards each other can be seen in FIG. 3. According to the illustration there, the recessed areas 40 engage with each other, and the surfaces described above in each case, in particular also the convex and the concave surfaces 42 and 46, lie against each other. This also applies to the end surfaces 45, which also abut one another.

Figure 4:
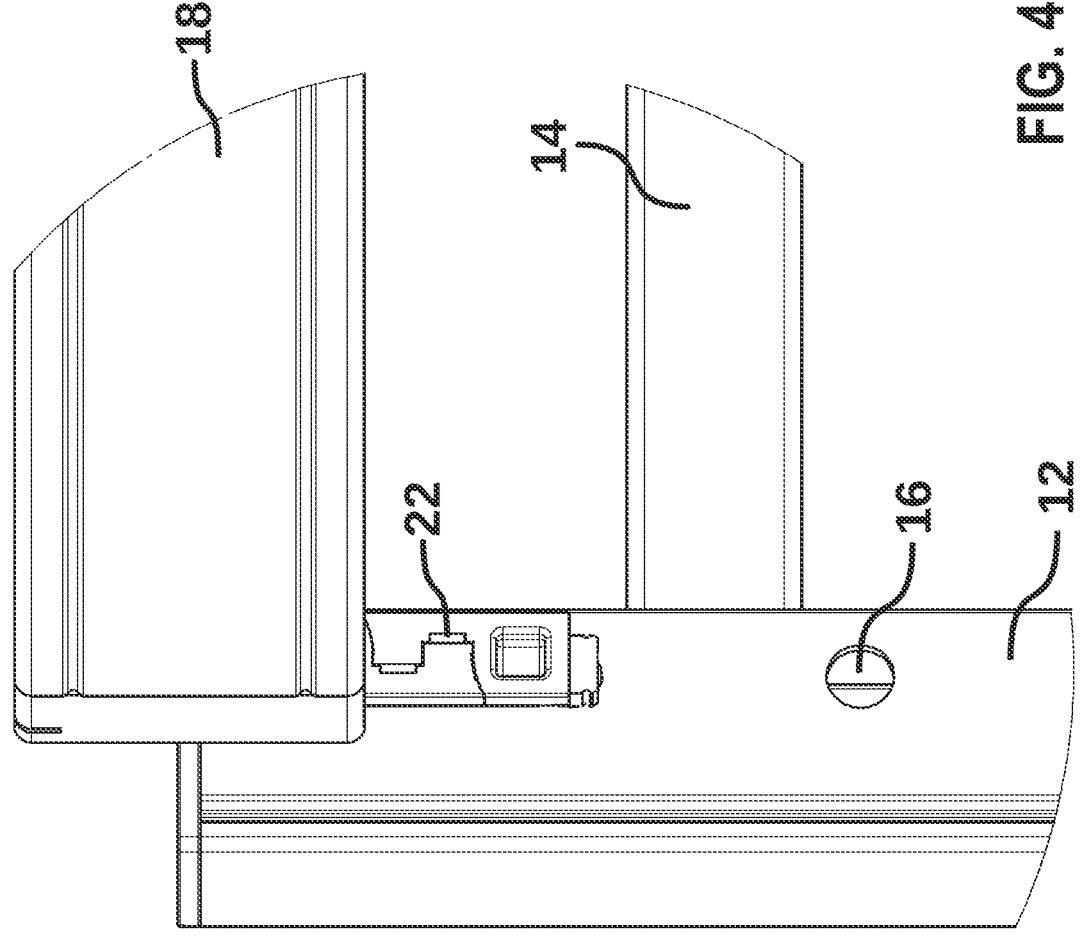
FIG. 4 shows an illustration of the process of pushing the connecting strut onto the undercut profile.

The transverse leg 34 and the center leg 36 also have surfaces extending parallel to the bar 12. This includes an upper end face 47, which is formed on each of the profile parts 26 and 28, and both end faces 47 extend flush with each other in the assembled state shown in FIG. 4.

The transverse surfaces 49 of the two profile parts 26 and 28 opposite the end face 47 on the transverse leg 34 also extend flush with one another, as do the other surfaces of the two profile parts 26 and 28, which are aligned with one another. Side surfaces 43 of the transverse legs 34 of the profile parts 26 and 28 also extend flush with each other. As can be seen from FIG. 4, the connecting strut 18 can be placed and pushed onto the undercut profile 22 from above with the receiving device 20.

Figure 5:
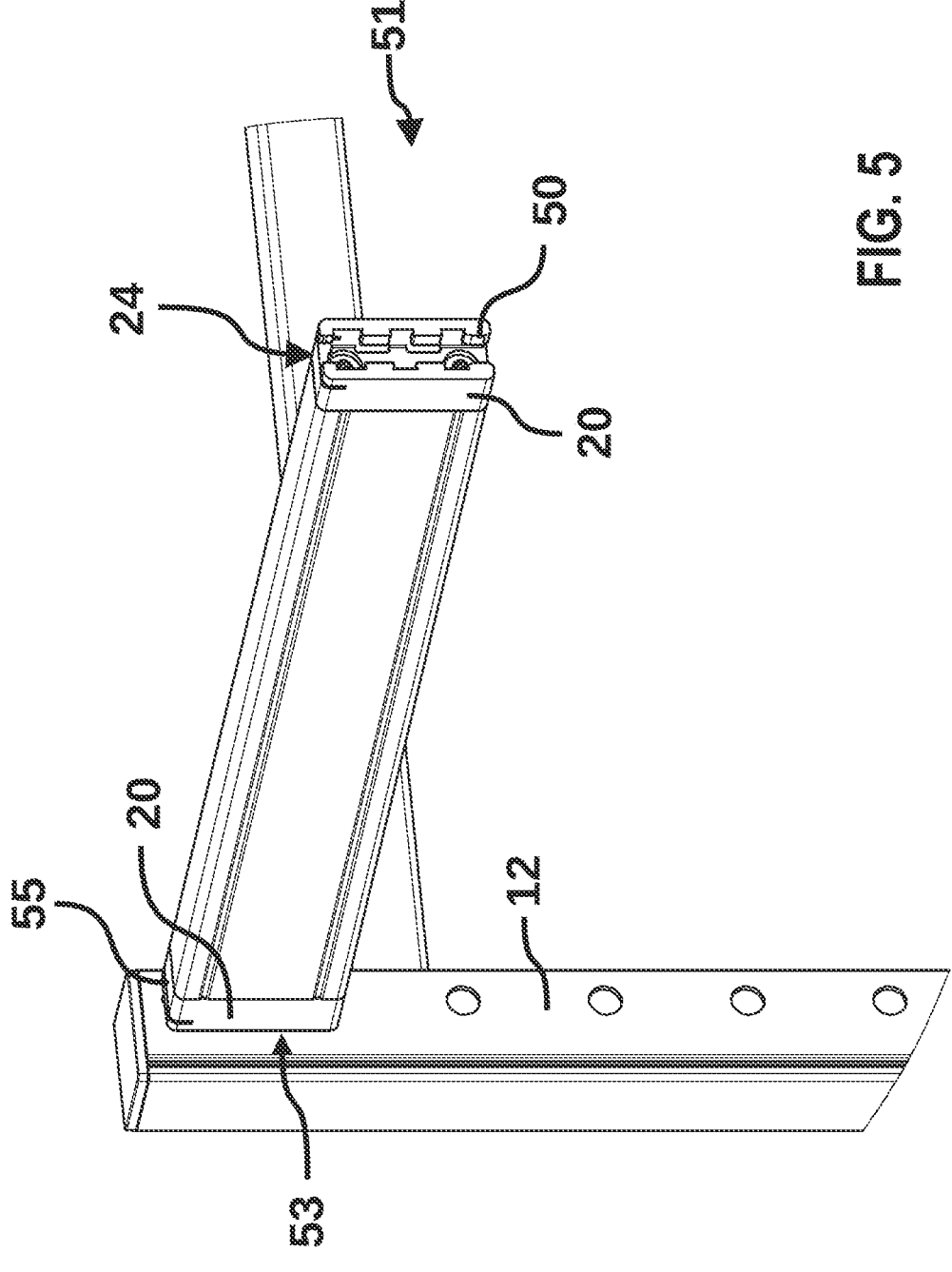
FIG. 5 shows a perspective illustration of a part of the inventive shelf system in the same exemplary embodiment, with the connecting strut placed on the undercut profile.

The pushed-on position can be seen in FIG. 5. Snap-in tongues 50 are provided at the lower end of the receiving device 20, which engage with notches not shown on the transverse leg 34 of the profile part 26 and hold the connecting strut 18 engaged on the bar 12. It is also apparent that the connecting strut 18 carries a receiving device 20 on each of its two end faces 51 and 53. At the upper ends of the receiving devices 20, this forms a stop 55 which abuts against the undercut profile 22 and prevents the strut 18 from moving further downwards.

Figure 6:
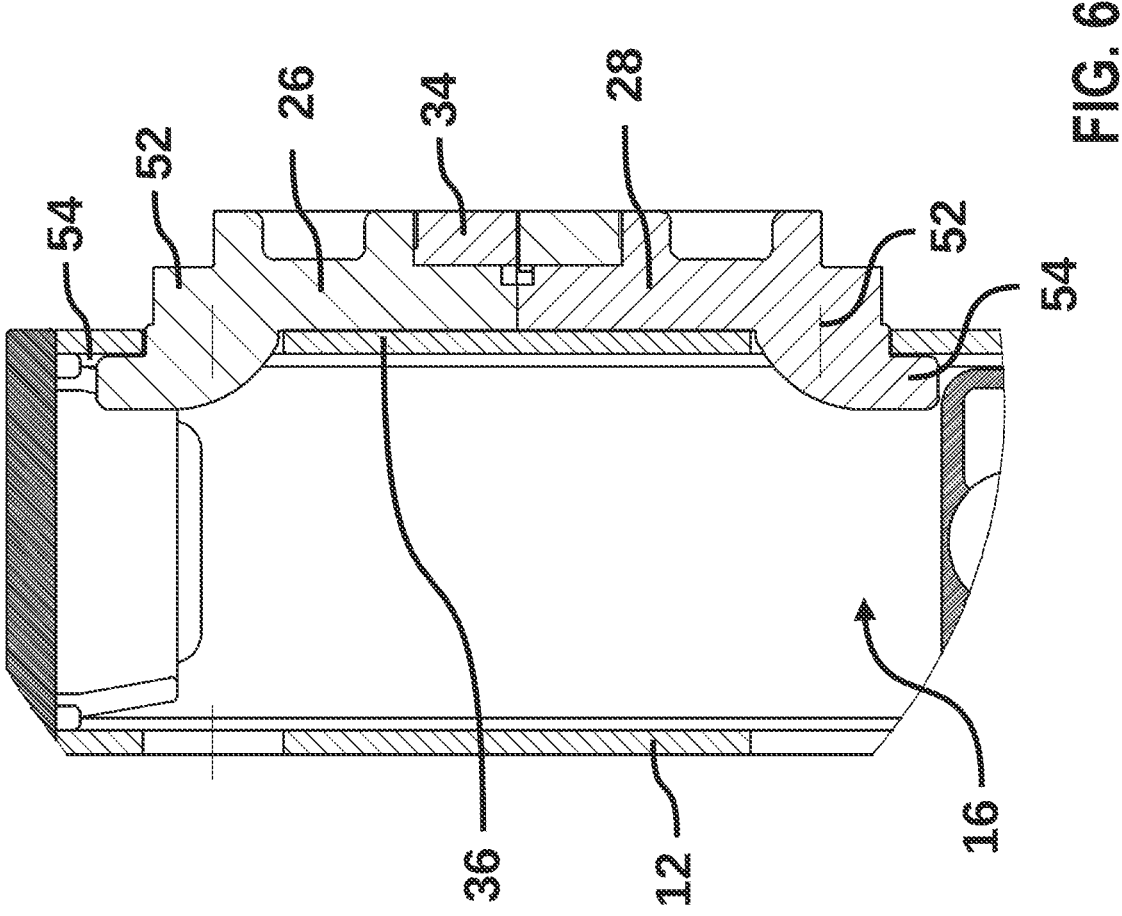
FIG. 6 shows a section through the undercut profile consisting of the two profile parts, in the state in which it is in engagement with the bar.

FIG. 6 shows the undercut profile 22 received on the bar 12. The projections 30 each pass-through adjacent recesses 16. The projections 30 each have a central region 52 and an end region 54. The central region 52 has a slightly smaller diameter than the recess 16. The end region 54 projects upwards, or downwards in the case of the profile part 28. It engages behind the wall of the bar and in this respect forms a locking tongue.

The region 54 abuts on the inside of the bar 16, and the center leg 36 abuts on the outside of the bar. In this respect, the height of the central region 52 corresponds substantially to the wall thickness of the bar 12.

Figure 7:
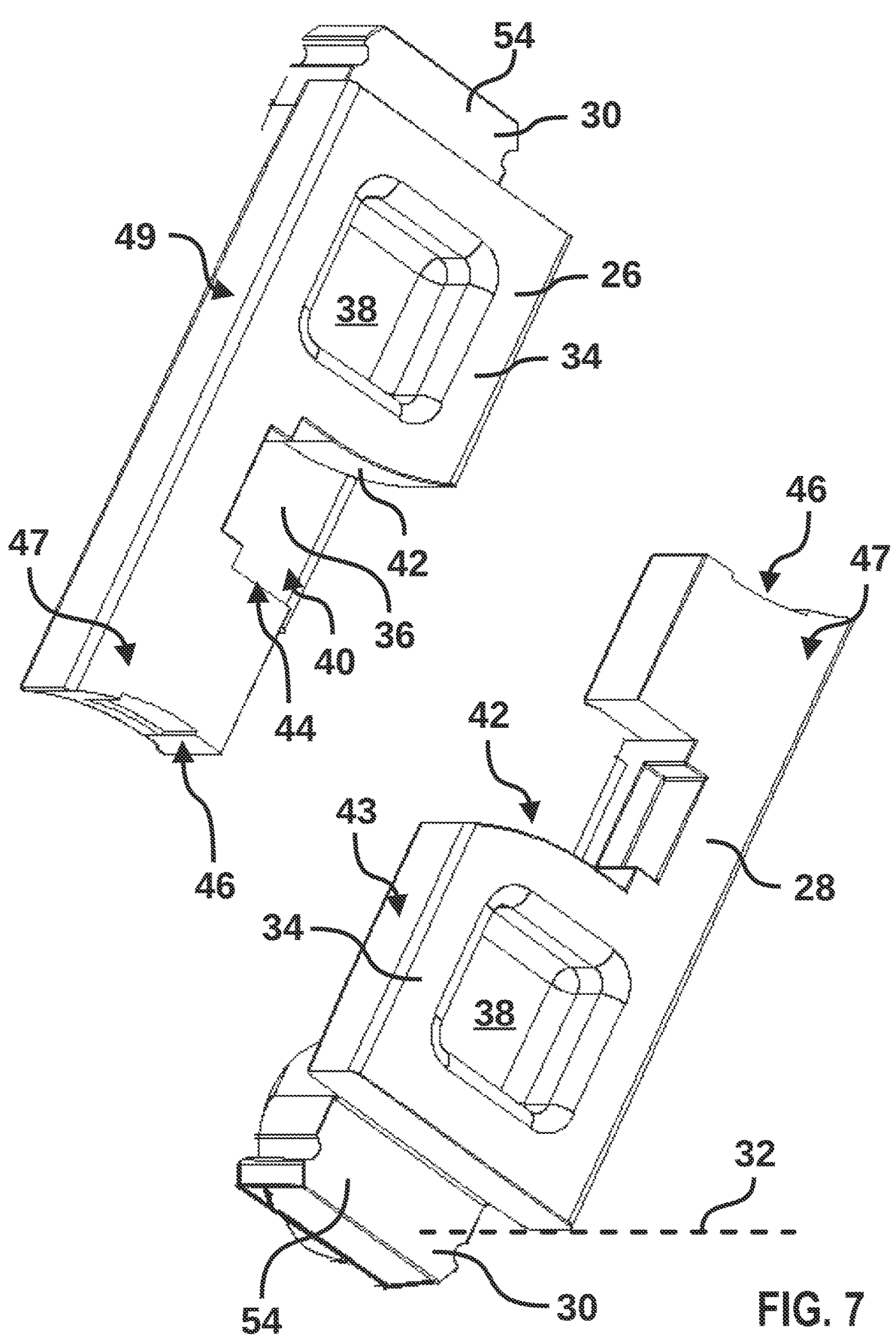
FIG. 7 shows a perspective view of the two profile parts.

FIG. 7 shows a perspective view of the two profile parts 26 and 28. Identical reference signs correspond here as well as in the other figures to identical parts. In the embodiment according to FIG. 7, the projection 30 of the two profile parts 26 and 28 has a slightly different shape. However, it does in any case pass through the wall 60 of the bar 12 shown in FIG. 8. For this purpose, the projection 30 has a smaller diameter than the recess 16 in the wall 60.

The central region 52 of the projection 30 is not immediately apparent from FIG. 7, but extends between the end region 54 and the center leg 36, which is also not apparent, see FIG. 6. As previously explained, the end region 54 of the projection 30 engages behind the wall 60 of the bar 12. The center leg 36 rests against the outside of the wall 60, and the pivoting of the profile parts 26 and 28 towards each other forms a solid body which is also firmly anchored in the adjacent recesses 16 of the bar 12.

Figure 8:
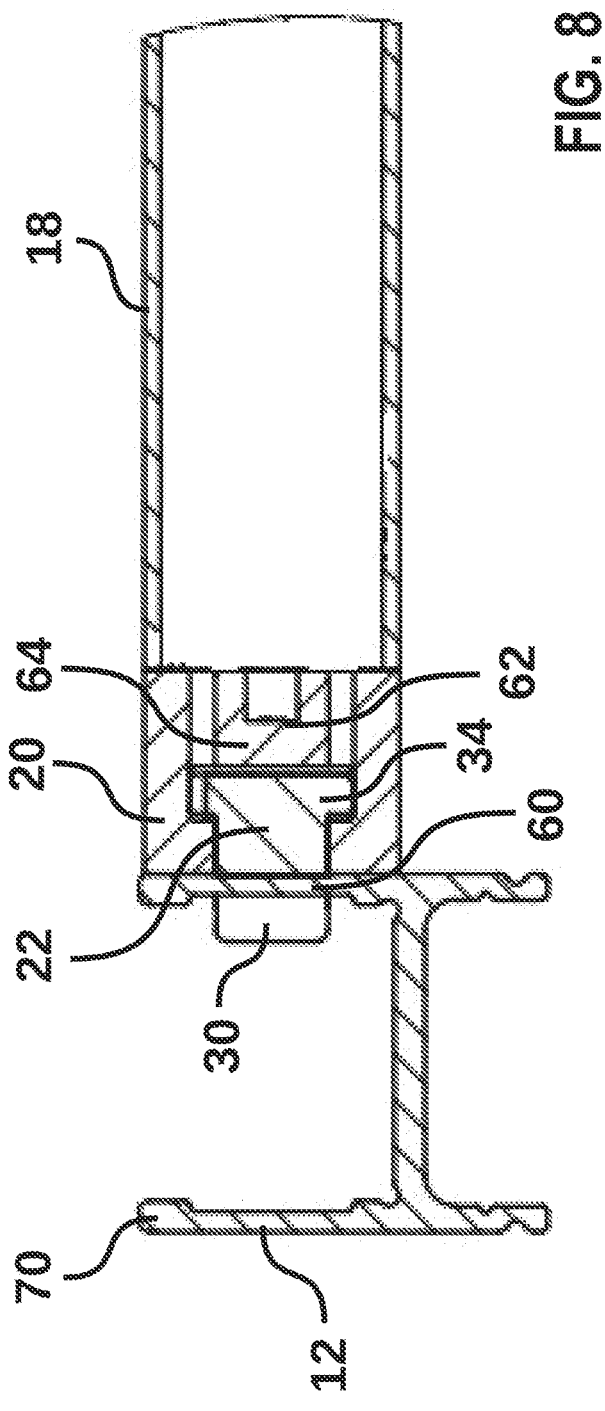
FIG. 8 shows a horizontal section through a bar, with connecting strut attached to the bar via the undercut profile and the receiving device.

FIG. 8 shows a section through a connecting strut 18 anchored in the bar 12. The receiving device 20 is attached to the connecting strut 18, for example by a screw connection. The screw connection 62 is not shown in FIG. 8, but extends through a central region 64 of the receiving device 20.

In the sectional view shown in FIG. 8, the receiving device 20 has a C-shaped cross-section. In contrast, the undercut profile 22 has a T-shaped cross section. The T fits exactly into the C. The recess 16 is not evident from FIG. 8 because it is on a different horizontal plane than the section there. However, the projection 30 is shown passing through the recesses 16 in the wall 60. The bar has a double-T cross-section known per se. It is asymmetrical, and the recesses 16 are formed on the side of the longer transverse legs 70.

It is understood that the foregoing description is that of the exemplary embodiments of the disclosure and that various changes and modifications may be made thereto without departing from the spirit and scope of the disclosure as defined in the appended claims.

What is claimed is:

1. A shelf system, comprising:

a plurality of bars; and at least one connecting strut for connecting two of the plurality of bars which are adjacent to one another, the at least one connecting strut having receiving devices on its end faces, wherein an undercut profile extending parallel to a bar of the plurality of bars is attached or can be attached to the bar of the shelf system, wherein the undercut profile has two or more profile parts which can be detached from one another and joined together, wherein each of the two or more profile parts has surfaces, wherein, in a joint state, edges of the two or more profile parts are arranged one after another in a longitudinal direction of the bar thereby forming continuous straight lines extending from one of the two or more profile parts to another of the two or more profile parts parallel to the bar such that the surfaces of the two or more profile parts form mutually flush surfaces, wherein each of the two or more profile parts has a projection which can be inserted into a recess of the bar, respectively, and wherein the receiving devices of the at least one connecting strut can be pushed onto the undercut profile in its joined state.

2. The shelf system according to claim 1, wherein the receiving devices have a stop at one end—viewed parallel to the bar—configured to block a movement of the undercut profile in the receiving devices.

3. The shelf system according to claim 1, wherein the two or more profile parts, when joined together, form mutually flush end faces and/or mutually flush side faces and/or mutually flush transverse faces, and wherein the mutually flush end faces and/or mutually flush side faces and/or mutually flush transverse faces, when joint together, extend parallel to the bar.

4. The shelf system according to claim 1, wherein the joining of the profile parts fixes them with their projections in recesses of the bar, in particular adjacent recesses.

5. The shelf system according to claim 1, wherein the profile parts can be pivoted with respect to one another for joining and for detaching.

6. The shelf system according to claim 1, wherein each profile part has a convex surface and a concave surface spaced apart from the convex surface, and wherein the convex surface of one profile part has a radius of curvature corresponding to the radius of curvature of the concave surface of the other profile part.

7. The shelf system according to claim 1, wherein the profile parts have clamping elements with which the profile parts engage with one another, and wherein the profile parts can be separated from one another by overcoming an engagement force.

8. The shelf system according to claim 1, wherein the profile parts are identical in shape to each other.

9. The shelf system according to claim 1, wherein in a pushed-on state of the receiving device in which the receiving device is pushed onto the undercut profile, detachment and/or pivoting of the profile parts is blocked.

10. The shelf system according to claim 1, wherein the projection can be inserted into the recess of the bar when the profile part is inclined with respect to the bar and can be withdrawn therefrom, and wherein when the profile part is aligned parallel to the bar, insertion and withdrawal are blocked.

11. The shelf system according to claim 1, wherein the receiving device has at least one snap-in tongue which engages in a snap-in notch of the undercut profile and allows the receiving device to be detached from the undercut profile only by overcoming an engagement force.

12. The shelf system according to claim 1, wherein each profile part can be pivoted about the projection and about an axis which extends transversely with respect to the bar.

13. The shelf system according to claim 1, wherein the two or more profile parts or the mutually flush surfaces are arranged one behind the other in a longitudinal direction of the bar.

14. A shelf system, comprising:

a plurality of bars; and at least one connecting strut for connecting two of the plurality of bars which are adjacent to one another, the at least one connecting strut having receiving devices on its end faces, wherein an undercut profile extending essentially parallel to a bar of the plurality of bars is attached or can be attached to the bar of the shelf system, wherein the undercut profile has two or more profile parts which can be detached from one another and joined together, wherein each of the two or more profile parts has surfaces, wherein, in a joint state, edges of the two or more profile parts are arranged in a line such that the surfaces of the two or more profile parts form mutually flush surfaces, wherein each of the two or more profile parts has a projection which can be inserted into a recess of the bar, respectively, wherein the receiving devices of the at least one connecting strut can be pushed onto the undercut profile in its joined state, wherein the receiving devices are C-shaped in section parallel to the connecting strut and form a C profile, wherein the undercut profile forms a T-profile in section parallel to the at least one connecting strut, and wherein the C-profile fits onto the T-profile with a clearance-free fit, optionally with a fit under pretension.

15. A shelf system, comprising:

a plurality of bars; and at least one connecting strut for connecting two of the plurality of bars which are adjacent to one another, the at least one connecting strut having receiving devices on its end faces, wherein an undercut profile extending essentially parallel to a bar of the plurality of bars is attached or can be attached to the bar of the shelf system, wherein the undercut profile has two or more profile parts which can be detached from one another and joined together, wherein each of the two or more profile parts has surfaces, wherein, in a joint state, edges of the two or more profile parts are arranged in a line such that the surfaces of the two or more profile parts form mutually flush surfaces, wherein each of the two or more profile parts has a projection which can be inserted into a recess of the bar, respectively, wherein the receiving devices of the at least one connecting strut can be pushed onto the undercut profile in its joined state, and wherein the projection consists of a round and flat-cylindrical cone-shaped central region and a locking tongue-like end region extending out of the latter and intended for engaging behind a wall of the bar.

16. The shelf system according to claim 15, wherein the locking tongue-like end region has dimensions which are smaller than a diameter of the recess of the bar, and wherein the locking tongue-like end region is bent at an end, or ends in a semicircular shape.

*   *   *   *   *